United States Patent
Mead et al.

(10) Patent No.: US 6,935,617 B2
(45) Date of Patent: Aug. 30, 2005

(54) VALVE ASSEMBLY FOR MICROFLUIDIC DEVICES, AND METHOD FOR OPENING AND CLOSING THE SAME

(75) Inventors: Dennis E. Mead, Campbell, CA (US); Zbigniew T. Bryning, Campbell, CA (US)

(73) Assignee: Applera Corporation, Foster City, CA (US)

( * ) Notice: Subject to any disclaimer, the term of this patent is extended or adjusted under 35 U.S.C. 154(b) by 214 days.

(21) Appl. No.: 10/625,449

(22) Filed: Jul. 23, 2003

(65) Prior Publication Data

US 2004/0195539 A1 Oct. 7, 2004

Related U.S. Application Data

(63) Continuation-in-part of application No. 10/426,587, filed on Apr. 30, 2003, now Pat. No. 6,817,373, and a continuation-in-part of application No. 10/403,640, filed on Mar. 31, 2003, and a continuation-in-part of application No. 10/403,652, filed on Mar. 31, 2003, and a continuation-in-part of application No. 10/336,706, filed on Jan. 3, 2003, and a continuation-in-part of application No. 10/336,274, filed on Jan. 3, 2003.

(60) Provisional application No. 60/398,851, filed on Jul. 26, 2002, and provisional application No. 60/398,946, filed on Jul. 26, 2002.

(51) Int. Cl.[7] ............................................. F16K 1/10
(52) U.S. Cl. ....................... 251/331; 251/61.1; 251/368
(58) Field of Search ............................. 251/331, 7, 61, 251/61.1, 368, 1

(56) References Cited

U.S. PATENT DOCUMENTS

| | | | |
|---|---|---|---|
| 3,724,807 A | * | 4/1973 | Jackson .......................... 251/7 |
| 4,304,260 A | * | 12/1981 | Turner et al. ............... 251/61.1 |
| 5,154,888 A | | 10/1992 | Zander et al. |
| 5,254,479 A | | 10/1993 | Chemelli |
| 5,288,463 A | | 2/1994 | Chemelli |
| 5,290,518 A | | 3/1994 | Johnson |
| 5,697,153 A | * | 12/1997 | Saaski et al. ........... 29/890.128 |
| 5,937,886 A | * | 8/1999 | Girard et al. ................ 251/331 |
| 6,099,290 A | * | 8/2000 | Gross ........................ 425/382.4 |
| 6,102,897 A | | 8/2000 | Lang |
| 6,426,230 B1 | | 7/2002 | Feistel |
| 6,575,188 B2 | | 6/2003 | Parunak |
| 6,595,484 B1 | * | 7/2003 | Gross ............................. 251/7 |
| 2002/0187560 A1 | | 12/2002 | Pezzuto et al. |
| 2003/0143754 A1 | | 7/2003 | Lum et al. |
| 2003/0156995 A1 | | 8/2003 | Gilligan et al. |
| 2003/0175162 A1 | | 9/2003 | Anazawa et al. |
| 2003/0190265 A1 | | 10/2003 | Anazawa et al. |

OTHER PUBLICATIONS

Copies of Notification of and International Search Report, mailed Nov. 18, 2003, for International Application No. PCT/US03/22897.

* cited by examiner

Primary Examiner—Kevin Lee
(74) Attorney, Agent, or Firm—Kilyk & Bowersox, P.L.L.C.

(57) ABSTRACT

A normally open fluid manipulation valve assembly and system and a method for closing, re-opening and re-closing same. The normally open valve assembly can include a substrate including a first surface, with first and second recesses formed in the first surface. A recessed channel can be formed in the first surface. The recessed channel can extend from the first recess to the second recess and can be at least partially defined by a first deformable material having a first modulus of elasticity. The valve assembly can also include an elastically deformable cover. The elastically deformable cover can include a layer of an elastically deformable material having a modulus of elasticity that is greater than the modulus of elasticity of the first deformable material, and an adhesive layer that contacts the first surface of the substrate.

37 Claims, 7 Drawing Sheets

VALVE ASSEMBLY FOR MICROFLUIDIC DEVICES, AND METHOD FOR OPENING AND CLOSING THE SAME

CROSS REFERENCE TO RELATED APPLICATION

This application claims the benefit of U.S. Provisional Application No. 60/398,946, filed Jul. 26, 2002, and is a continuation-in-part of application Ser. No. 10/336,274, filed Jan. 3, 2003, which claims the benefit of U.S. Provisional Application No. 60/398,851, filed Jul. 26, 2002; this application is a continuation-in-part of application Ser. No. 10/336,706, filed Jan. 3, 2003; this application is a continuation-in-part of application Ser. No. 10/403,652, filed Mar. 31, 2003; this application is a continuation-in-part of application Ser. No. 10/403,640, filed Mar. 31, 2003; and this application is a continuation-in-part of application Ser. No. 10/426,587, filed Apr. 30, 2003 now U.S. Pat. No. 6,817,373. All U.S. Patent Applications and U.S. Provisional Patent Applications mentioned herein are incorporated herein in their entireties by reference.

FIELD

The assemblies, systems, and methods described herein relate to microfluidic devices. More particularly, the present teachings relate to valve assemblies for use in microfluidic devices that can be opened and closed to manipulate, process, or otherwise alter micro-sized amounts of fluids and fluid samples.

BACKGROUND

Microfluidic devices are useful for manipulating fluid samples through the use of openable and closeable valves. There continues to exist a demand for valves for use in microfluidic devices, and methods for such valves, that allow for the processing of a large number of fluid samples simultaneously, quickly, and reliably.

SUMMARY

According to various embodiments, a valve assembly is provided. The valve assembly can include a substrate including a first surface, with first and second recesses formed in the first surface. A recessed channel can be formed in the first surface and the recessed channel can be recessed relative to the first surface. The recessed channel can extend from the first recess to the second recess, and can be at least partially defined by a first deformable material having a first modulus of elasticity.

The valve assembly can also include an elastically deformable cover. The elastically deformable cover can include a layer of an elastically deformable material having a modulus of elasticity that is greater than the modulus of elasticity of the first deformable material. An adhesive layer can contact the first surface of the substrate. The elastically deformable cover can be arranged to cover the recessed channel and form a fluid communication between the first and second recesses when the elastically deformable cover layer is in a non-deformed state.

According to various embodiments, a system can be provided including the valve assembly described above. The system can further include a platform including at least one holder for holding the assembly, as well as a first deformer. A drive unit can be capable of driving the first deformer toward the assembly and can be capable of applying a deforming force to at least one of the elastically deformable cover and the deformable material of the recessed channel. The first deformer can be capable of forcing the adhesive layer against the recessed channel to prevent fluid communication between the first and second recesses.

According to various embodiments, a closed valve assembly can be re-opened. The drive unit of the system can be capable of driving the first deformer including a channel blade to deform the elastically deformable cover and the material of the recessed channel. The drive unit can also be capable of bringing the first deformer out of contact with the elastically deformable cover such that the cover elastically rebounds faster than the deformed material of the recessed channel. A fluid communication can thereby be formed between the first and second recesses by way of a fluid communication opening.

According to various embodiments, the re-opened valve assembly can be re-closed. To re-close the valve assembly, the drive unit can include a deformer including a contact pad disposed at one end thereof. The deformer can be driven by the drive unit such that the pad can contact the elastically deformable cover layer and force adhesive of the adhesive layer into the deformation channel to close the fluid communication between the first and second recesses.

According to various embodiments, methods are provided for closing an initially open fluid communication situated between two recesses of a microfluidic assembly, and then re-opening, and then re-closing the fluid communication.

According to various embodiments, the valve assembly and system, and the method of opening and closing the valve assembly, allow for the processing of a large number of samples, such as micro-sized amounts of fluids and fluid samples, simultaneously, quickly, and reliably.

Additional features and advantages of various embodiments will be set forth in part in the description that follows, and in part will be apparent from the description, or may be learned by practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DETAILED DESCRIPTION OF VARIOUS EMBODIMENTS

Figure 1A:
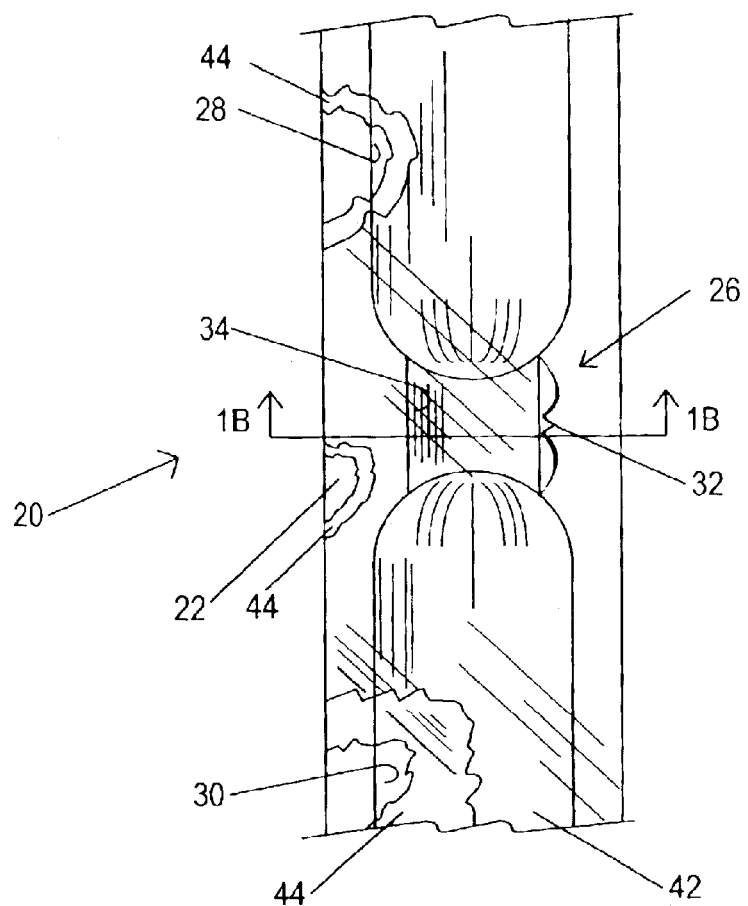
FIG. 1A is a partial cut-away top view of a substrate layer of a substrate layer of a fluid manipulation valve assembly according to various embodiments, shown in an initial non-actuated stage.

FIG. 1A shows a partial cut-away top view of a substrate layer portion 22 of a fluid manipulation valve assembly 20 according to various embodiments. At least two recesses 28, 30 can be formed in the substrate layer 22, and can be separated by an intermediate wall 32. The intermediate wall 32 can define an area of a valve 26 that can be manipulated to control fluid communication between the two recesses 28, 30. The intermediate wall 32 can be formed from a deformable material that can be melastically or elastically deformable. According to various embodiments, the entire substrate layer 22 can include an inelastically or elastically deformable material.

According to various embodiments, the substrate layer 22 of the assembly 20 can include a single layer of material, a coated layer of material, a multi-layered material, and combinations thereof Various other characteristics of the substrate layer 22, such as dimensions, different levels and layers of recesses, as well as other properties, for example, are described in U.S. patent application Ser. No. 10/336,274, filed Jan. 3, 2003, to Bryning et al. (hereinafter Bryning et al.), which has been incorporated herein in its entirety by reference above. An exemplary substrate can be made of a single-layer substrate of a non-brittle plastic material, such as polycarbonate or TOPAS, a plastic cyclic olefin copolymer material available from Ticona (Celanese AG), Summit, N.J., USA.

According to various embodiments, plastics can be used to form the components of the valve assembly 20, such as the substrate layer 22. The plastics can include polycarbonate, polycarbonate/ABS blends, ABS, polyvinyl chloride, polystyrene, polypropylene oxide, acrylics, polybutylene terephthalate and polyethylene terephthalate blends, nylons, blends of nylons, and combinations thereof. Additional materials used to form the valve assembly 20, for example, are disclosed in Brynig et al.

According to various embodiments, the substrate layer 22 can be made of a material, for example, glass or plastic, that can withstand thermal cycling at temperatures between 60° C., and 95° C., as for example, experienced while performing polymerase chain reaction (PCR). Furthermore, the material should be sufficiently strong to withstand a force necessary to achieve manipulation of a fluid sample through the assembly 20, for example, centrifugal force necessary to spin and manipulate a sample within the assembly 20.

Figure 1B:
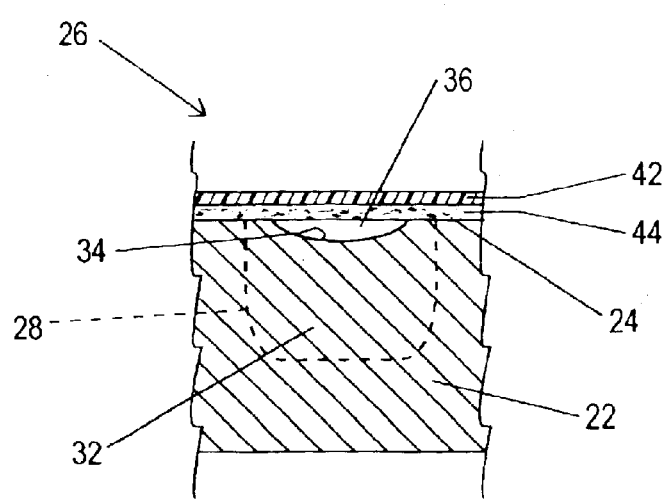
FIG. 1B is a cross-sectional side view of the fluid manipulation valve assembly shown in FIG. 1A, taken along line 1B—1B of FIG. 1A, and in an initial non-actuated stage.

FIG. 1B is a cross-sectional side view of the valve 26 shown in FIG. 1A, taken along line 1B—1B of FIG. 1A. The valve 26 can include an elastically deformable cover including a cover layer 42 and an adhesive layer 44. The adhesive layer 44 can include, for example, a pressure sensitive or hot melt adhesive, disposed between the substrate layer 22 and the elastically deformable cover layer 42. The elastically deformable cover can be attached to a surface 24 of the substrate layer 22 by way of any conventional attachment procedure. For example, the cover layer 42 can be heat welded to the surface 24 of the substrate layer 22. According to various embodiments, the elastically deformable cover layer 42 and the adhesive layer 44 can be transparent. However, according to various embodiments, either or both of these layers can be opaque.

According to various embodiments, the elastically deformable cover can cover portions of the recess-containing substrate layer 22 in areas where a portion of the substrate layer 22 is to be deformed. For example, the cover can cover any number of a plurality of recesses serially aligned, all of the recesses, or the area comprising the intermediate wall 32. The cover can partially cover one or more recesses, chambers, inlet ports, ducts, and the like. The cover layer 42 of the cover can have elastic properties that enable it to be temporarily deformed as a deformer contacts and deforms the intermediate wall 32, for example, underneath the cover layer 42, as disclosed, for example, in Bryning et al.

As shown in FIG. 1B, a height of the intermediate wall 32 between the recesses 28, 30 can be formed with a depression relative to a surface 24 of the substrate layer 22, thereby forming a recessed channel 34. Moreover, the non-depressed portion of the intermediate wall 32 can be flush with a top surface 24 of the recess-containing substrate layer 22 of the assembly 20. As illustrated in FIG. 1B, in the non-deformed state of the cover layer 42, the recessed channel 34 of the intermediate wall 32 can form a fluid communication 36 between the first recess 28 and the second recess 30. Therefore, in the non-deformed state of the elastically deformable cover, the valve 26 is in a normally open condition.

According to various embodiments, the following describes the ability of the valve 26 of the fluid manipulation valve assembly 20 to be closed using mechanical pressure, and temperature, for example, as well as the ability of the valve 26 to be re-opened again, and then re-closed again. In particular, the following describes how the adhesive of the adhesive layer 44 is manipulated to open and close the valve 26.

Figure 2A:
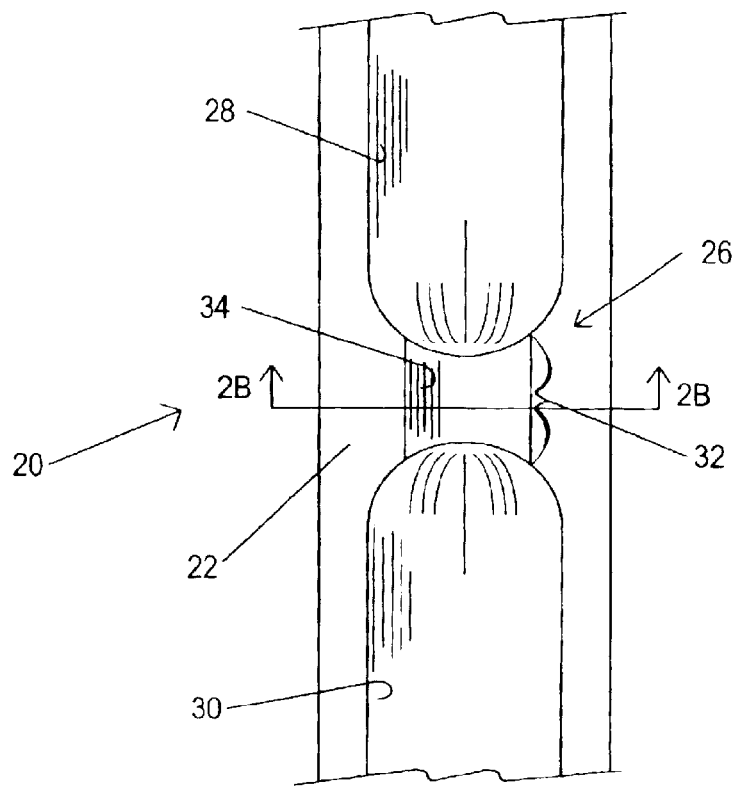
FIG. 2A is a top view of the substrate layer of the fluid manipulation valve assembly according to various embodiments, shown without an elastically deformable cover and in a first stage of actuation of the valve assembly.
Figure 2B:
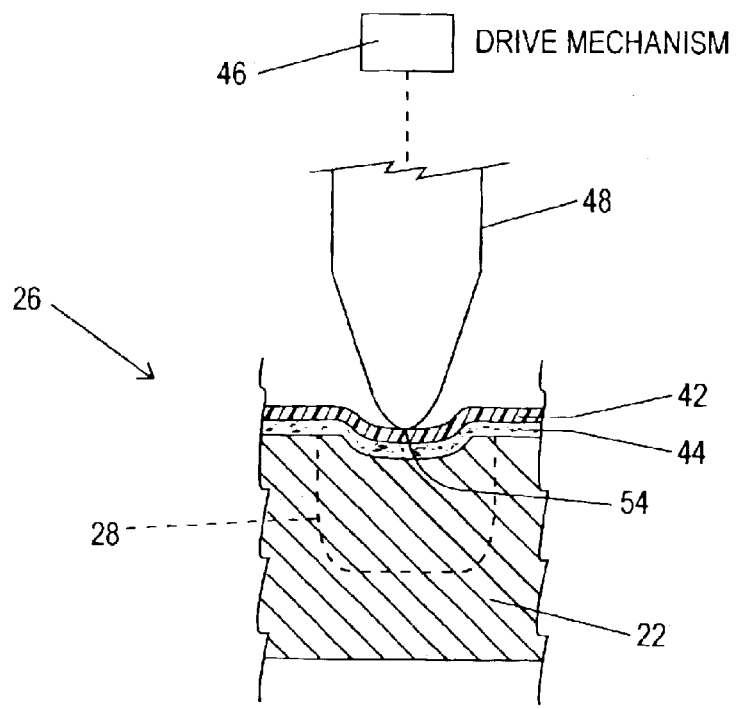
FIG. 2B is a cross-sectional side view of the fluid manipulation valve assembly shown in FIG. 2A, taken along line 2B—2B as shown in FIG. 2A, and shown with the elastically deformable cover in a deformed state corresponding to the first stage of actuation.

FIGS. 2A and 2B show a top view and a cross-sectional side view, respectively, of the valve 26 of the fluid manipulation valve assembly 20 in the first valve closing condition. In FIG. 2B, the valve 26 is shown in deforming contact with a first deformer 48 positioned after initiation of, and during, the first valve closing condition. The first deformer 48 can include a length that extends in a direction from the first recess 28 toward the second recess 30. The length can be at least as long as the length of the intermediate wall 32, or alternatively, the first deformer 48 can be shorter than the length of the intermediate wall. As can be seen in FIG. 2B, a drive mechanism 46 can be arranged to displace the first deformer 48 in a direction towards the cover layer 42 such that a contact surface 54 of the first deformer 48 deforms the cover layer 42 and the adhesive layer 44 towards the recessed channel 34. In the first valve closing condition, the fluid communication 36 between the first recess 28 and the second recess 30 can be sealed or closed. FIG. 2A illustrates a top view of the substrate layer portion 22 when the valve 26 is in the first valve closing condition. In FIG. 2A, as well as in FIGS. 3A–6A, the fluid manipulation valve assembly 20 is illustrated without the elastically deformable cover such that the features of the substrate layer 22 can be seen without looking through the elastically deformable cover. According to various embodiments, the substrate layer 22 in the area of the intermediate wall 32 is not necessarily deformed by the first deformer 48 in the first valve closing condition. According to various embodiments, the first deformer 48 can be removed from contacting the cover layer 42, and the cover layer 42 can stay adhered to the recessed channel 34 by way of the adhesive layer 44.

Figure 3B:
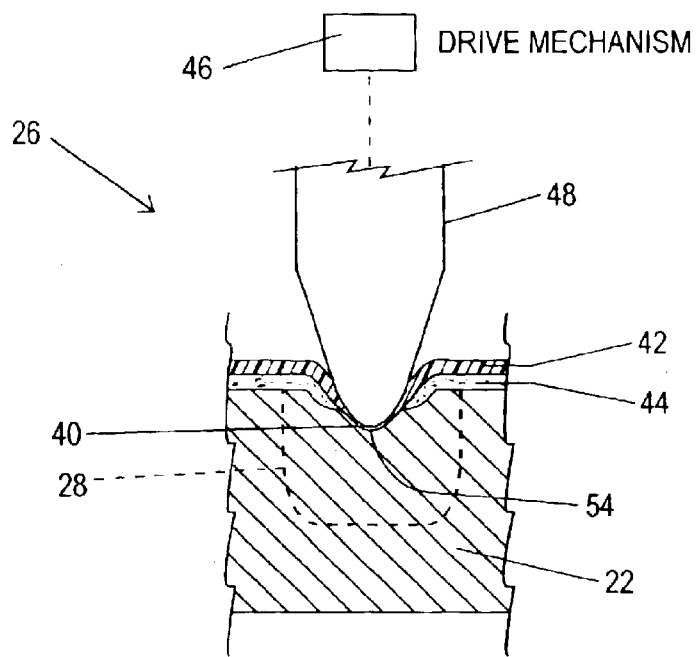
FIG. 3B is a cross-sectional side view of the fluid manipulation valve assembly shown in FIG. 3A, taken along line 3B—3B of FIG. 3A, and shown with the elastically deformable cover in a further deformed state corresponding to the second stage of actuation.
Figure 4A:
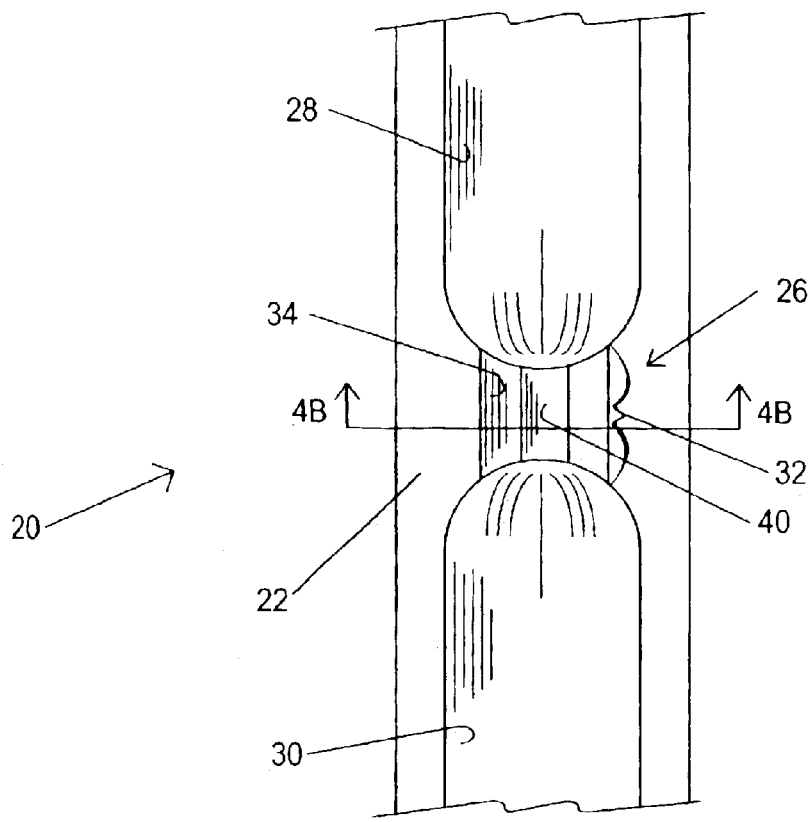
FIG. 4A is a top view of the substrate layer of the fluid manipulation valve assembly according to various embodiments, shown without the elastically deformable cover and in a third stage of actuation of the valve assembly.
Figure 4B:
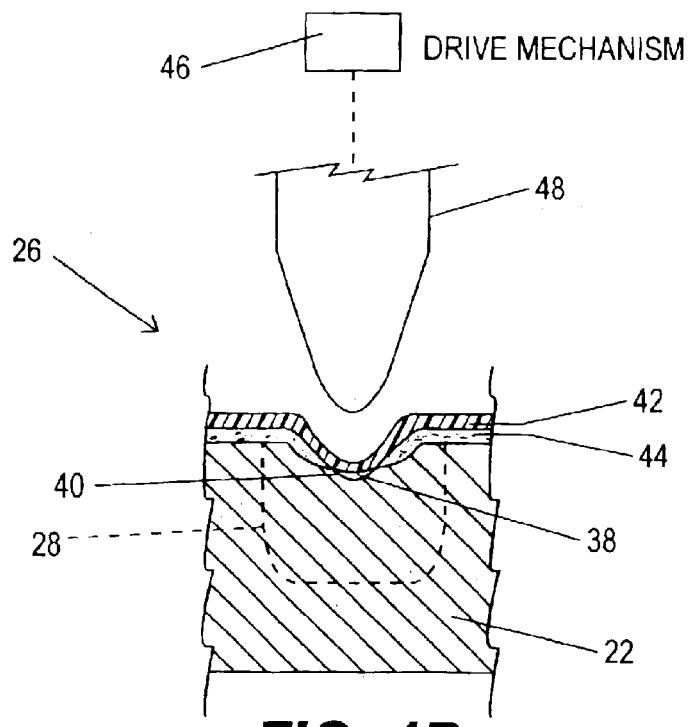
FIG. 4B is a cross-sectional side view of the fluid manipulation valve assembly shown in FIG. 4A, taken along line 4B—4B of FIG. 4A, and shown with the elastically deformable cover partially rebounded from the substrate layer corresponding to the third stage of actuation.

According to various embodiments, the currently closed valve 26 of the fluid manipulation valve assembly 20 is capable of being re-opened, and then re-closed. FIGS. 2B, 3B and 4B sequentially illustrate a procedure for re-opening the valve 26 starting from the first valve closing condition, according to various embodiments.

As can be seen in FIG. 3B, in a first re-opening step, the drive mechanism 46 can further actuate the first deformer 48 such that the contact surface 54 of the first deformer 48 deforms the cover layer 42 into the intermediate wall portion 32 of the substrate layer 22, thereby also displacing adhesive in a direction away from the first deformer 48. As a result, the intermediate wall 32 can be deformed by the deforming force of the first deformer 48 to form a deformation channel 40 in the substrate layer 22. With respect to FIG. 3B, the first deformer 48 can press the elastically deformable cover layer 42 through the adhesive layer 44 such that substantially none of the adhesive can be present between the cover layer 42 and the deformation channel 40. As a result, as discussed below with reference to FIG. 4B, when the first deformer 48 is removed from being in contact with the valve 26, the cover layer 42 can elastically rebound, forming a fluid communication opening 38.

Figure 7:
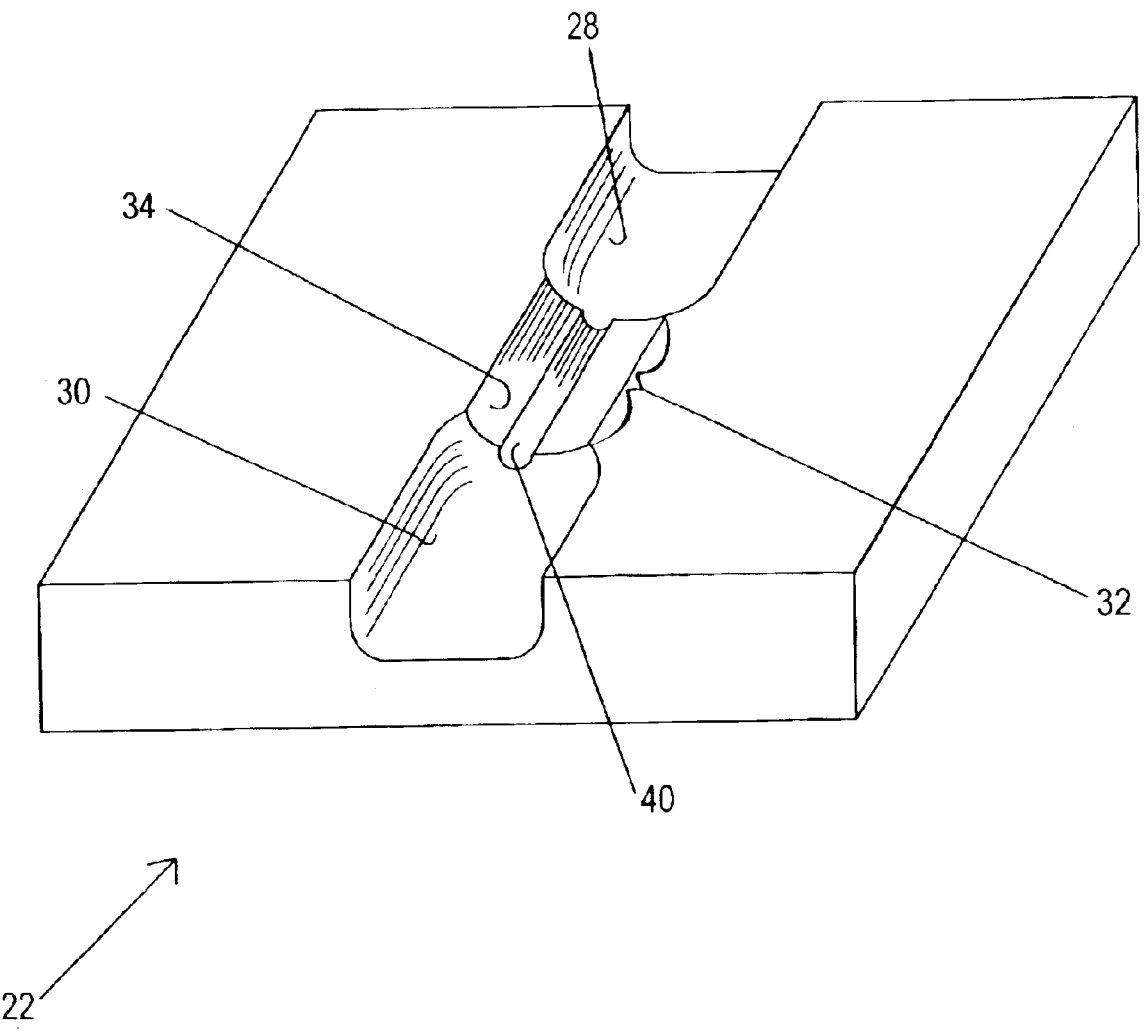
FIG. 7 is a perspective view of the substrate layer of the fluid manipulation valve assembly according to various embodiments.

The deformation channel 40 is also shown in FIG. 7, which illustrates a perspective view of the substrate layer 22 along with various depressions and channels formed therein. The cover layer 42 and the adhesive layer 44 have been omitted in FIG. 7 to more clearly illustrate the features of the substrate layer 22. According to various embodiments, only a portion of the recessed channel 34 of the intermediate wall 32 can be deformed to partially form a fluid communication between the two recesses 28, 30.

Figure 3A:
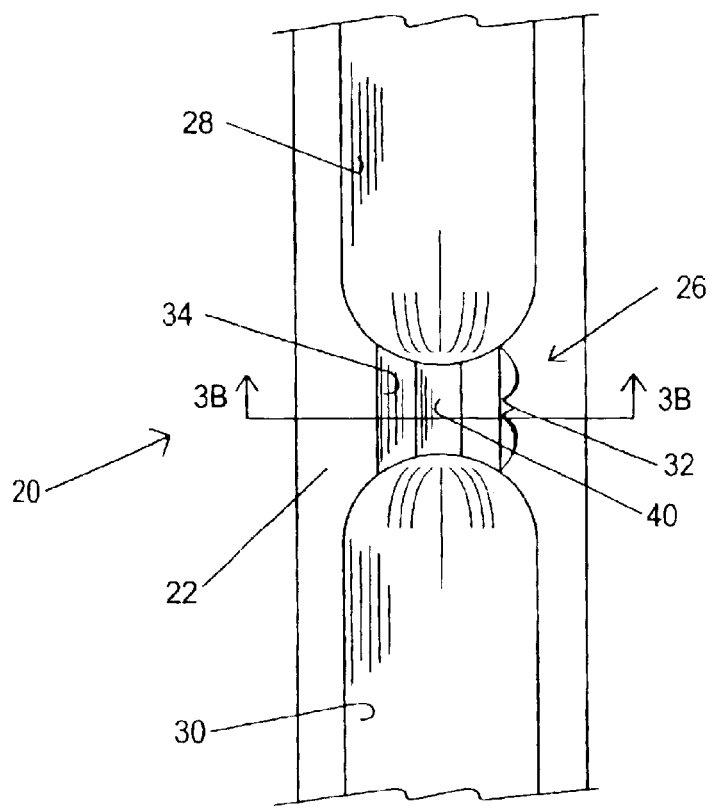
FIG. 3A is a top view of the substrate layer of the fluid manipulation valve assembly according to various embodiments, shown without the elastically deformable cover and in a second stage of actuation of the valve assembly.

FIG. 3A illustrates a top view of the substrate layer portion 22 after the first re-opening step. According to various embodiments, and referring to FIGS. 3A and 7, the first deformer 48 (shown in FIG. 3B) forms the deformation channel 40 within the recessed channel 34 of the intermediate wall 32.

According to various embodiments, the deformable material of the intermediate wall 32 can be inelastically or elastically deformable. If the deformable material of the intermediate wall 32 is elastically deformable, it can be less elastically deformable (have a greater modulus of elasticity) than the material of the elastically deformable cover layer 42, whereby the cover layer 42 is able to recover or rebound from the deformation, more quickly than the intermediate wall material, as disclosed, for example, in Bryning et al. For the sake of example, but not to be limiting, the material of the intermediate wall 32 is described as being inelastically deformable.

FIG. 4B illustrates the second re-opening step which re-establishes the fluid communication between the recesses 28, 30. In the second re-opening step, the first deformer 48 is withdrawn from contacting the valve 26, thereby allowing the elastically deformable cover layer 42 to recover or rebound in a direction away from the deformation channel 40 formed in the intermediate wall 32. The inelastically deformable material of the intermediate wall 32 remains deformed, or remains deformed for a particular period of time, after the first deformer 48 is withdrawn. Upon recovering or rebounding, a portion of the elastically deformable cover layer 42 adjacent the deformation channel 40 of the intermediate wall 32, is spaced a set distance from the deformation channel 40 such that a fluid communication opening 38 can be formed. Thus, the fluid communication between the first and second recesses 28, 30 can be re-established.

According to various embodiments, the elastically deformable cover layer 42 can return back substantially to its original state after deformation to achieve fluid communication between the two or more recesses. Alternatively, the elastically deformable cover layer 42 can rebound to any extent sufficient to achieve fluid communication. According to various embodiments, the elastically deformable cover layer 42 does not necessarily have to be completely elastic, but should be sufficiently elastic to rebound a distance that is greater than about 25% of its deformed distance, for example, greater than about 50% of its deformed distance.

The elastically deformable cover layer 42 can be chemically resistant and inert, as can be the substrate layer 22. The elastically deformable cover layer 42 can be selected to be able to withstand thermal cycling, for example, between about 60° C. and about 95° C., as may be experienced during PCR. Any suitable elastically deformable film material can be used, for example, elastomeric materials. The thickness of the cover layer 42 should be sufficient for the cover layer 42 to be deformed by the deformer 48 as required to re-shape the intermediate wall 32 beneath the cover layer 42. Under such deforming, the elastically deformable cover layer 42 should not puncture or break and should substantially return to its original orientation after deforming an underlying intermediate wall. Various other characteristics of elastically deformable cover layers 42, such as material properties and bending characteristics, are disclosed, for example, in Bryning et al.

According to various embodiments, the deformers used can include any of a variety of shapes, for example a shape that leaves an impression in the inelastically deformable material of the substrate layer 22 that results in a fluid communication being formed between the two recesses or recessed portions of the assembly 20. A straight edge, chisel-edge, or pointed-blade design, for example, can be used to form a trough or other channel for achieving a fluid communication between the two deformers. Other characteristics of deformers for use are disclosed, for example, in Bryning et al.

The assembly 20, according to various embodiments, can include a variety of deformers, for example, one or more opening blade deformers 48 (as disclosed above and shown in FIGS. 2B, 3B and 4B, for example) and one or more closing blade deformers 50 (as discussed below and shown in FIGS. 5B and 6B, for example). Such systems or assemblies can be used in connection with processing assemblies that include at least one series of recesses, one or more of which is in fluid communication with another, and one or more of which is separated from another by an intermediate wall. More details about the assembly are set forth below.

Figure 5A:
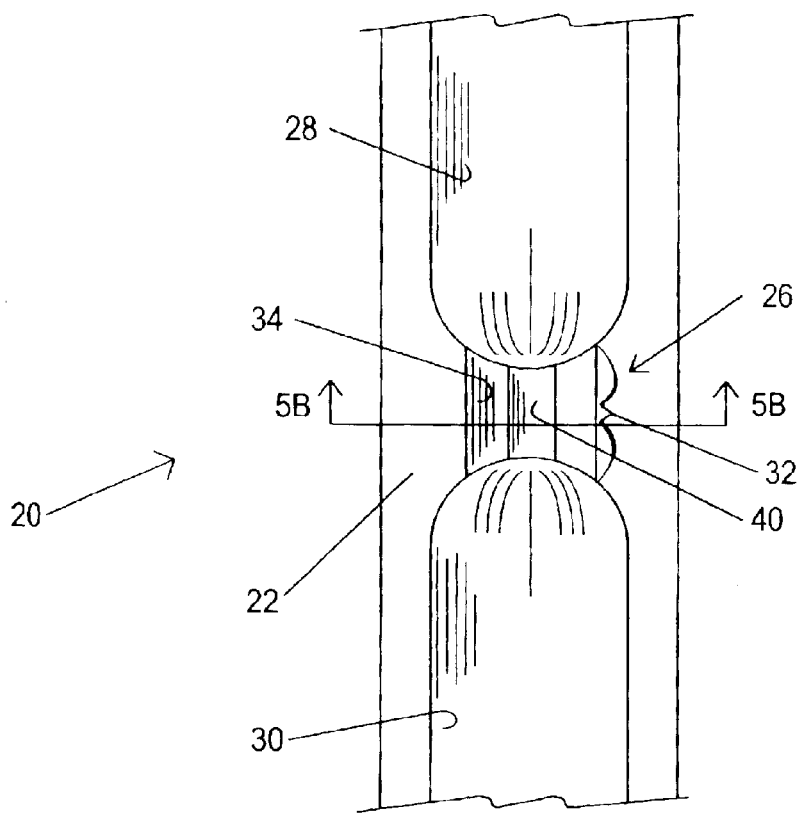
FIG. 5A is a top view of the substrate layer of the fluid manipulation valve assembly according to various embodiments, shown without the elastically deformable cover and prior to a fourth stage of actuation of the valve assembly.
Figure 5B:
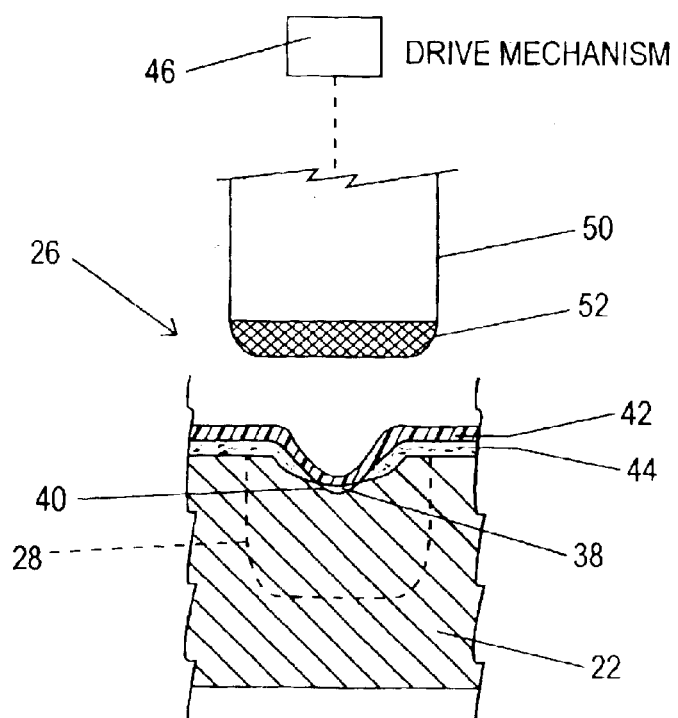
FIG. 5B is a cross-sectional side view of the fluid manipulation valve assembly shown in FIG. 5A, taken along line 5B—5B of FIG. 5A, and shown with the elastically deformable cover partially rebounded from the substrate layer.
Figure 6A:
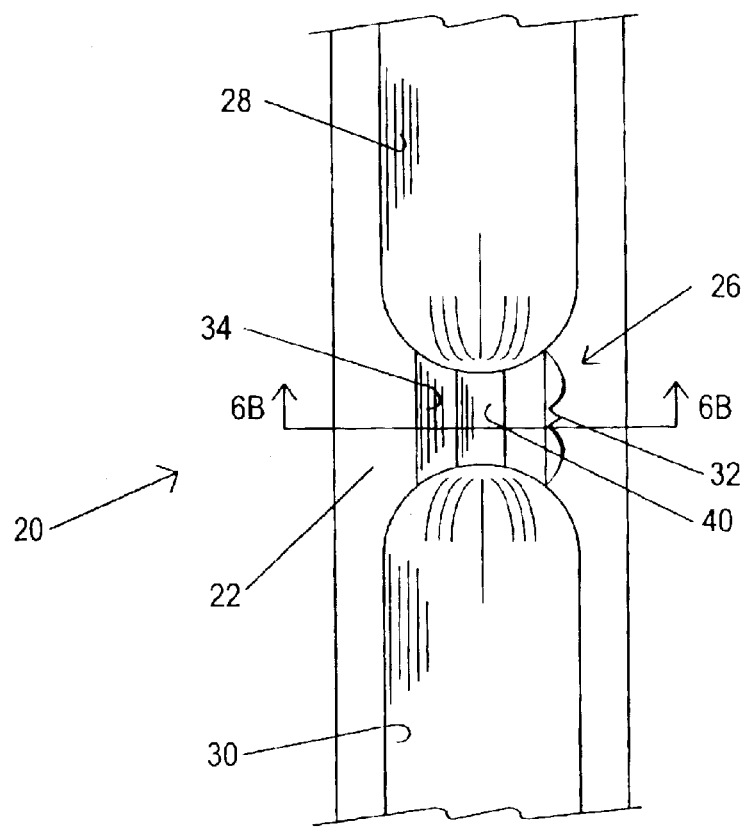
FIG. 6A is a top view of the substrate layer of the fluid manipulation valve assembly according to various embodiments, shown without the elastically deformable cover and in a fourth stage of actuation of the valve assembly.
Figure 6B:
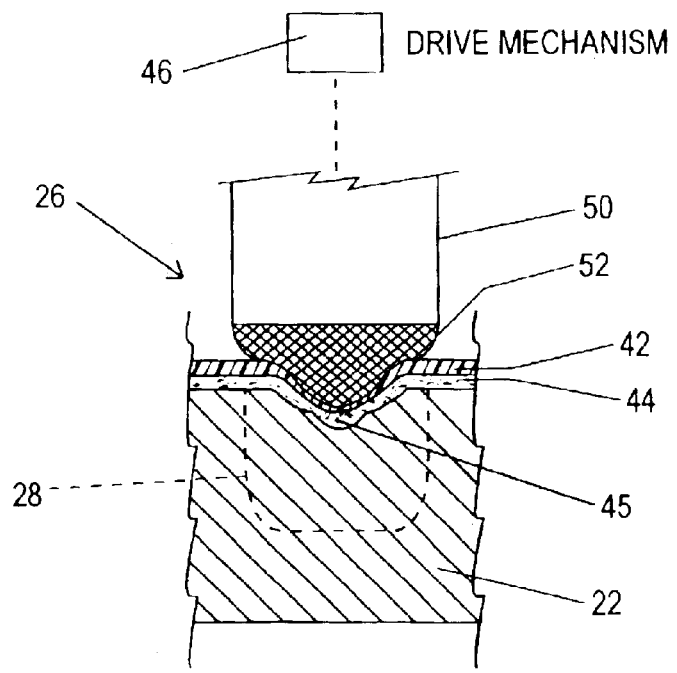
FIG. 6B is a cross-sectional side view of the fluid manipulation valve assembly shown in FIG. 6A, taken along line 6B—6B of FIG. 6A, and shown with the elastically deformable cover in a further deformed state, whereby the valve assembly has been re-closed corresponding to the fourth stage of actuation.

FIGS. 4B, 5B and 6B sequentially illustrate a procedure for re-closing the valve 26 starting from the condition that fluid communication between the first and second recesses 28, 30 has been re-established by way of the formation of the fluid communication opening 38. As can be seen in FIG. 5B, in a first re-closing step, the drive mechanism 46 can drive a second deformer 50 in a direction towards and into contact with the elastically deformable cover layer 42 of the open valve 26. The second deformer 50 can include a contact pad 52 or similar compliant device attached at an actuating end thereof.

FIG. 6B illustrates the second re-closing step which results in the fluid communication between the recesses 28, 30 being re-closed. In the second re-closing step, the drive mechanism 46 can force the contact pad 52 of the second deformer 50 into contact with the elastically deformable cover layer 42. When forcibly brought into contact with the cover layer 42, the contact pad 52 can mold into the shape of the depression formed by the cover layer 42, the adhesive layer 44 and the intermediate wall 32. As a result of the compliant or malleable characteristics of the pad 52, the material of the pad 52 can operate to manipulate the adhesive 45 of the adhesive layer 44 into the area of the fluid communication opening 38, thereby re-closing the valve 26.

According to various embodiments, the resilient characteristics of the contact pad 52 allows its shape to change when forced into contact with a structure, such as a valve assembly. The contact pad 52 can be a material that is chemically resistant and inert. The material of the contact pad can be selected to be able to withstand thermal cycling, as may be required while performing PCR. Any suitable elastically deformable and malleable material can be used, for example, a soft rubber, such as silicone rubber. The particular softness characteristics of the contact pad can be chosen depending on the flow characteristics of the adhesive used in the adhesive layer 44. According to various embodiments, the contact pad 52 can have a memory, such that it reverts back to its original orientation after being forced into contact with the valve 26. The thickness of the contact pad 52 should be sufficient for the pad to be deformed to an extent such that it can fill the depression formed in the cover layer 42 during previous processing steps.

Alternatively or additionally, the contact pad 52 can be capable of heating the components of the valve assembly. According to various embodiments, the contact pad 52 can heat the adhesive layer 44, when the contact pad is forced into contact with the valve assembly. For example, the contact pad 52 can be formed partially or entirely of a thermally conductive material or of a material that can act as a resistance heater, or the contact pad 52 can be arranged as a radiant heater, as described in U.S. patent application Ser. No. 10/359,668, filed Feb. 6, 2003, to Shigeura, that is incorporated herein in its entirety by reference. When the contact pad 52 of the second deformer 50 is formed of a thermally conductive material, the contact pad 52 can be heated by convection or conduction, for example. When the contact pad 52 of the second deformer 50 is made of a material that operates as a resistance heater, it can be heated by running an electrical current through the contact pad 52, for example. A contact pad 52 formed as a resistance heater can be arranged to include appropriate electrical contacts, that can provide the contact pad 52 in electrical contact with a power source.

According to various embodiments, when the contact pad 52 is in the position of contacting the cover layer 42, the temperature of the contact pad 52 can be in a range such that heat transferred to the adhesive layer 44 can reduce the viscosity of the adhesive 45. By heating and, in turn, reducing the viscosity of the adhesive 45, a heat emitting contact pad 52 can assist in the closing, or re-closing of the valve 26, by promoting the manipulability of the adhesive 45. Various types of adhesives, such as pressure sensitive adhesives and hot melt adhesives, for example, can be heated to improve their manipulability.

According to various embodiments, the deformer 48, as disclosed in relation to FIGS. 2B–4B, can be capable of heating a valve assembly, as described above with reference to the second deformer 50. For example, the deformer 48 can be formed of a thermally conductive material, a material that can act as a resistance heater, or as a radiant heater,. For example, when the deformer 48 is in the position shown in FIG. 2B, and the cover layer 42 and the adhesive layer 44 are forced into contact with the recessed channel 34, the deformer 48 can be used to heat the adhesive of the adhesive layer 44, to adhere or assist in adhering the cover layer 42 to the recessed channel 34 to close the valve assembly. According to various embodiments, the entire deformer 48, or a portion of the deformer 48, for example, the tip or a contact portion of the tip, can be formed of a material that can transfer heat to heat the components of the valve assembly.

According to various embodiments, after the contact pad 52 is forced into contact with the elastically deformable cover layer 42 and manipulates the adhesive to re-close the valve 26, the drive mechanism 46 can be then be operated to retract the second presser 50 from the valve 26.

According to various embodiments, the adhesive layer 44 can be any suitable manipulatable adhesive. For example, pressure sensitive adhesives or hot melt adhesives can be used. Examples of pressure sensitive adhesives include, silicone pressure sensitive adhesives, fluorosilicone pressure sensitive adhesives, and other polymeric pressure sensitive adhesives. Characteristics that are considered in choosing an adhesive include, for example, tackiness, viscosity, melting point, malleability. The application of heat to the adhesive can assist in opening and closing the valve 26.

According to various embodiments, the adhesive layer 44 can have any suitable thickness and preferably does not deliteriously affect any sample, desired reaction, or treatment of a sample processed through the assembly. The adhesive layer 44 can be more adherent to the elastically deformable cover layer 42 than to the underlying inelastically deformable material, and can rebound with the elastically deformable cover layer 42.

With the valve 26 in the re-closed condition, as shown in FIG. 6B, the complete cycle of closing, re-opening and re-closing a normally open valve 26 according to various embodiments has been completed.

The series of steps shown in FIGS. 1A–6A and FIGS. 6A—6B can be sequential or in any other order. For example, the valve 26 can be opened starting from an initially closed position, or the valve 26 can be closed from the initially open position shown in FIG. 5B.

According to various embodiments, the assembly can be provided as a system with a positioning unit including a platform and holder for registering the area of the assembly to be deformed, with a particular deformer. Precision positioning drive systems can be used to enable the particular deformer and the valve assembly to be moved relative to one another such that the feature of the valve assembly to be deformed is aligned and registered with the deformer.

According to various embodiments, the fluid manipulation valve assembly 20 can be disk-shaped, card-shaped, or include any other suitable or appropriate shape, the specific shape being suitably adaptable for specific applications. The assembly 20, or the substrate layer 22 of the assembly 20 can be shaped to provide a series of generally linearly extending recesses or chambers that can be fluidically connected to one another by valves 26 according to various embodiments. For example, series of recesses can be provided in assemblies according to various embodiments whereby centrifugal force can be applied to the assembly to move a fluid sample from one recess of a series to a subsequent recesses in the series, by centrifugal force. For example, disk-shaped assemblies including radially-extending series of recesses are provided according to various embodiments.

The assembly 20 can be sized to be conveniently processed by a technician. Depending upon the number of series of chambers or configuration desired, the assembly 20 can include any appropriate size, i.e. diameter, thickness, length, as disclosed, for example, in Bryning et al.

Assemblies 20 according to various embodiments can include two or more recesses separated by an intermediate wall, and inlet and/or outlet ports to access the recesses. Inlet and outlet ports can be provided through various surfaces of the assembly can be arranged to provide various fluid communications, such as a venting arrangement, as disclosed, for example, in Bryning et al.

According to various embodiments, methods are provided for opening and closing a fluid communication between at least two recesses, the at least two recesses being separated by at least one intermediate wall.

According to various embodiments, a method provides closing and opening an initially open fluid communication between two recesses. The method includes elastically deforming the cover against the substrate layer 22 to close the initially open fluid communication 36 between the two recesses 28, 30. More specifically, the method includes driving the elastically deformable cover of the assembly with a first deformer 48 to deform the cover against the recessed channel 34 of the substrate layer 22 and close the initially open fluid communication 36. The first deformer 48 can then be brought out of contact with the elastically deformable cover.

To re-open the fluid communication, the method includes forcing the first deformer 48 against the elastically deformable cover to deform the deformable material of the recessed channel 34. The first deformer 48 is then brought out of contact with the cover such that the cover elastically rebounds faster than the deformed material of the recessed channel 34 and a fluid communication 36 results between the first and second recesses 28, 30.

According to various embodiments, methods are provided for forming a barrier to re-close the fluid communication 36 between the two recessed portions of the assembly. According to such methods, a deformer 50 including a contact pad 52 disposed at one end is forced against the elastically deformable cover. The contact pad 52 forces adhesive 45 of the adhesive layer 44 into a deformation channel 40 to close the fluid communication opening 38 formed between the first and second recesses 28, 30. The deformer 50 is then moved out of contact with the elastically deformable cover.

According to various embodiments, after an assembly has been deformed to form a fluid communication, the deformed assembly can then be treated or processed to achieve a product, for example, a reaction product or a purification product. Methods of manipulating the flow of fluids and other components within various chambers of a series of chambers can be effected by, for example, centrifugal force, electrical forces such as are used in electrophoresis or in electroosmosis, pressure, vacuum, gravity, centripetal force, capillary action, or by any other suitable fluid manipulating technique, or combination thereof. As a result of a fluid manipulation step, the manipulated fluid can be reacted in a newly-entered chamber, for example, by PCR under thermal cycling conditions, by a sequencing reaction under specified thermal conditions, by purification, and/or by any combination of treatments.

Those skilled in the art can appreciate from the foregoing description that the present teachings can be implemented in a variety of forms. Therefore, while these teachings have been described in connection with particular embodiments and examples thereof, the present teachings should not be so limited.

What is claimed is:

1. A valve assembly comprising:
    a substrate including;
        a first surface;
        a first recess formed in the first surface;
        a second recess formed in the first surface; and
        a recessed channel that is recessed relative to the first surface of the substrate and extending from the first recess to the second recess, the recessed channel being at least partially defined by a first deformable material having a first modulus of elasticity;
    an elastically deformable cover including;
        a layer of an elastically deformable material having a modulus of elasticity that is greater than the modulus of elasticity of the first deformable material; and
        an adhesive layer in contact with the first surface of the substrate;
    wherein the elastically deformable cover covers the recessed channel and forms a fluid communication between the first and second recesses when the elastically deformable cover layer is in a non-deformed state.

2. The valve assembly of claim 1, wherein in a deformed state of the elastically deformable cover, the adhesive layer is capable of contacting the recessed channel.

3. The valve assembly of claim 1, wherein the substrate comprises a polycarbonate material.

4. The valve assembly of claim 1, wherein the substrate comprises a cyclic olefin copolymer material.

5. The valve assembly of claim 1, wherein the adhesive layer comprises a pressure sensitive adhesive.

6. The valve assembly of claim 1, wherein the adhesive layer comprises a hot melt adhesive.

7. A system comprising:
a valve assembly including;
   a substrate including;
      a first surface;
      a first recess formed in the first surface;
      a second recess formed in the first surface; and
      a recessed channel that is recessed relative to the first surface of the substrate and extending from the first recess to the second recess, the recessed channel being at least partially defined by a first deformable material having a first modulus of elasticity;
   an elastically deformable cover including;
      a layer of an elastically deformable material having a modulus of elasticity that is greater than the modulus of elasticity of the first deformable material; and
      an adhesive layer in contact with the first surface of the substrate;
   wherein the elastically deformable cover covers the recessed channel and forms a fluid communication between the first and second recesses when the elastically deformable cover layer is in a non-deformed state;
a platform including at least one holder for supporting the valve assembly; and
a first deformer including a drive unit capable of driving the first deformer toward the valve assembly and applying a deforming force to at least one of the elastically deformable cover and the deformable material of the recessed channel.

8. The system of claim 7, wherein the first deformer is capable of forcing the adhesive layer against the recessed channel to prevent fluid communication between the first and second recesses.

9. The system of claim 8, wherein the first deformer includes a distal tip and an electrically resistive heater at or adjacent the distal tip.

10. The system of claim 7, wherein the first deformer includes a channel blade that is capable of being driven by the drive unit to deform the elastically deformable cover and the material defining the recessed channel.

11. The system of claim 10, wherein the drive unit is further capable of bringing the first deformer out of contact with the elastically deformable cover such that the cover elastically rebounds faster than the deformed material of the recessed channel and a fluid communication results between the first and second recesses by way of a fluid communication opening.

12. The system of claim 7, wherein the substrate comprises a polycarbonate material.

13. The system of claim 7, wherein the substrate comprises a cyclic olefin copolymer material.

14. The system of claim 7, wherein the adhesive layer comprises a pressure sensitive adhesive.

15. The system of claim 7, wherein the adhesive layer comprises a hot melt adhesive.

16. A valve assembly comprising:
a substrate including;
   a first surface;
   a first recess formed in the first surface;
   a second recess formed in the first surface;
   a recessed channel that is recessed relative to the first surface of the substrate and extends from the first recess to the second recess; and
   a deformation channel that is recessed relative to the recessed channel and extends from the first recess to the second recess;
   wherein the recessed channel and the deformation channel are at least partially defined by a first deformable material having a first modulus of elasticity;
an elastically deformable cover including;
   a layer of an elastically deformable material having a modulus of elasticity that is greater than the modulus of elasticity of the first deformable material; and
   an adhesive layer in contact with the first surface of the substrate;
wherein, in a deformed state of the elastically deformable cover, a portion of the elastically deformable cover is spaced from the deformation channel and forms a fluid communication opening between the first and second recesses.

17. The valve assembly of claim 16, wherein the substrate comprises a polycarbonate material.

18. The valve assembly of claim 16, wherein the substrate comprises a cyclic olefin copolymer material.

19. The valve assembly of claim 16, wherein the adhesive layer comprises a pressure sensitive adhesive.

20. The valve assembly of claim 16, wherein the adhesive layer comprises a hot melt adhesive.

21. A system comprising:
a valve assembly including;
   a substrate including;
      a first surface;
      a first recess formed in the first surface;
      a second recess formed in the first surface;
      a recessed channel that is recessed relative to the first surface of the substrate and extends from the first recess to the second recess; and
      a deformation channel that is recessed relative to the recessed channel and extends from the first recess to the second recess;
      wherein the recessed channel and the deformation channel are at least partially defined by a first deformable material including a first modulus of elasticity;
   an elastically deformable cover including;
      a layer of an elastically deformable material having a modulus of elasticity that is greater than the modulus of elasticity of the first deformable material; and
      an adhesive layer in contact with the first surface of the substrate;
   wherein, in a deformed state of the elastically deformable cover, a portion of the elastically deformable cover is spaced from the deformation channel and forms a fluid communication opening between the first and second recesses.
a platform including at least one holder for supporting the valve assembly; and
a first deformer including a drive unit capable of driving the first deformer toward the valve assembly and applying a deforming force to the elastically deformable cover.

22. The system of claim 21, wherein the first deformer includes a contact pad disposed at one end thereof, the first deformer being capable of being driven by the drive unit such that the pad can contact the elastically deformable cover layer and force adhesive of the adhesive layer into the deformation channel to close the fluid communication between the first and second recesses.

23. The system of claim 22, wherein the contact pad of the first deformer includes an electrically resistive heater disposed at or adjacent the one end of the first deformer.

24. The system of claim 22, wherein the drive unit is further capable of bringing the first deformer out of contact with the elastically deformable cover after closing the fluid communication opening between the first and second recesses.

25. The system of claim 21, wherein the substrate comprises a polycarbonate material.

26. The system of claim 21, wherein the substrate comprises a cyclic olefin copolymer material.

27. The system of claim 21, wherein the adhesive layer comprises a pressure sensitive adhesive.

28. The system of claim 21, wherein the adhesive layer comprises a hot melt adhesive.

29. A method comprising:
  providing a valve assembly including:
    a substrate including;
      a first surface;
      a first recess formed in the first surface;
      a second recess formed in the first surface; and
      a recessed channel that is recessed relative to the first surface of the substrate and extending from the first recess to the second recess, the recessed channel being at least partially defined by a first deformable material having a first modulus of elasticity;
    an elastically deformable cover including;
      a layer of an elastically deformable material having a modulus of elasticity that is greater than the modulus of elasticity of the first deformable material; and
      an adhesive layer in contact with the first surface of the substrate;
    wherein the elastically deformable cover covers the recessed channel and forms a fluid communication between the first and second recesses when the elastically deformable cover layer is in a non-deformed state;
  driving a first deformer against the elastically deformable cover to deform the cover and force the adhesive layer against the recessed channel to prevent fluid communication between the first and the second recesses.

30. The method of claim 29, further comprising transferring heat energy from the first deformer to the adhesive layer when the first deformer is driven against the deformable cover.

31. The method of claim 29, further comprising bringing the first deformer out of contact with the elastically deformable cover, whereby the adhesive layer adheres the deformable material of the cover against the recessed channel to prevent fluid communication between the first and the second recesses.

32. The method of claim 29, further comprising driving the first deformer against the elastically deformable cover to deform the deformable material of the recessed channel.

33. The method of claim 32, further comprising bringing the first deformer out of contact with the elastically deformable cover such that the cover elastically rebounds faster than the deformed material of the recessed channel and a fluid communication results between the first and second recesses.

34. A method of closing a fluid communication between a first recess and a second recess of a valve assembly, comprising:
  providing a valve assembly including;
    a substrate including;
      a first surface;
      a first recess formed in the first surface;
      a second recess formed in the first surface;
      a recessed channel that is recessed relative to the first surface of the substrate and extends from the first recess to the second recess; and
      a deformation channel that is recessed relative to the recessed channel and extends from the first recess to the second recess;
    an elastically deformable cover including;
      a layer of an elastically deformable; and
      an adhesive layer in contact with the first surface of the substrate;
  driving a first deformer including a contact pad disposed at one end thereof against the elastically deformable cover such that the contact pad forces adhesive of the adhesive layer into the deformation channel to close the fluid communication opening between the first and second recesses.

35. The method of claim 34, further comprising transferring heat energy from the contact pad of the first deformer to the adhesive.

36. The method of claim 34, further comprising bringing the first deformer out of contact with the elastically deformable cover.

37. The method of claim 34, wherein the second recess retains a purification material.

* * * * *